United States Patent

Foster

[15] 3,665,484

[45] May 23, 1972

[54] MAGNETIC RECORDING SYSTEMS

[72] Inventor: Alan Foster, Hitchin, England

[73] Assignee: International Computers Limited, London, England

[22] Filed: July 30, 1970

[21] Appl. No.: 59,613

[30] Foreign Application Priority Data

July 30, 1969 Great Britain......................38,139/69

[52] U.S. Cl...................346/74 MP, 178/6.6 A, 235/61.12 M

[51] Int. Cl...................G06k 19/00, G06k 19/06, G11b 5/80

[58] Field of Search.................346/74 MP, 74 M; 178/6.6 A; 235/61.12 M, 61.12 C

[56] References Cited

UNITED STATES PATENTS

| | | | |
|---|---|---|---|
| 3,401,394 | 4/1964 | Leonard | 346/74 MP |
| 3,526,708 | 9/1970 | Leatherman | 346/74 MP |
| 2,784,392 | 3/1957 | Chiamowicz | 235/61.12 M |
| 3,564,214 | 2/1971 | Cooper | 235/61.12 C |

*Primary Examiner*—Howard W. Britton
*Attorney*—Misegades and Douglas, Keith Misegades and George R. Douglas, Jr.

[57] ABSTRACT

A magnetic recording apparatus in which fixed information, which may be an outline of a business form, is recorded as a predetermined pattern on a magnetizable member. A magnetic recording member is separated from the magnetizable member by a screening member which includes a plurality of magnetic elements thereon. The magnetic elements are positioned on a backing layer and selectively prevent the magnetic field produced by the recording means from changing the magnetic state of the magnetizable member so that the predetermined pattern is recorded on the magnetizable member. The screening member may also include further small magnetic materials to increase the number of magnetic fringe fields which will allow a more uniform change of state of areas of the magnetizable member.

4 Claims, 3 Drawing Figures

PATENTED MAY 23 1972 3,665,484

MAGNETIC RECORDING SYSTEMS

BACKGROUND OF THE INVENTION

This invention relates to magnetic recording systems. It is known to record a magnetic pattern corresponding to the outline of visually readable characters on a magnetizable member, such as a drum or tape. A magnetizable powder is applied to the surface of the member and it adhers perferentially to the surface where the pattern has been recorded, to provide a visually readable representation of the magnetic pattern. By the use of a suitable powder, a permanent record of the pattern may be obtained by transferring the powder pattern to paper and fixing the powder to the paper by heating, for example.

Since the system requires mechanical movement only for feeding the magnetizable member and the paper, it is suitable for use as a high speed printer in conjunction with computers. In many applications, the computer output consists of a relatively small amount of data which has to be printed in the correct position on a pre-printed form, such as a pay slip or a premium renewal notice. The use of pre-printed stationery is relatively costly and raises problems of accurate registration of the data being printed relative to the form layout. Hence, it is desirable that the form layout and the variable data should be printed at the same time on plain stationery.

It will be apparent that the data necessary to specify the whole of the form layout could be stored in the computer and combined with the variable data before printing, so that the desired end would be achieved. However, the form layout data, particlarly if several different forms may be required, would pre-empt a substantial part of the total storage capacity of the computer.

SUMMARY

According to the invention, apparatus for recording a predetermined magnetic pattern on a magnetizable member includes a recording member position adjacent the magnetizable member for producing a magnetic field, means for producing a period of relative movement between said recording and magnetizable members, and a screening member interposed between said recording and magnetizable members, said screening member being effectively stationary relative to said magnetizable member and selectively preventing the magnetic field from changing the magnetic state of the magnetizable member so that the predetermined pattern is recorded on the magnetizable member during said period.

BRIEF DESCRIPTION OF THE DRAWING

Magnetic recording apparatus embodying the present invention will now be described, by way of example, with reference to the accompanying drawing in which.

DESCRIPTION OF THE PREFERRED EMBODIMENT

Figure 1:
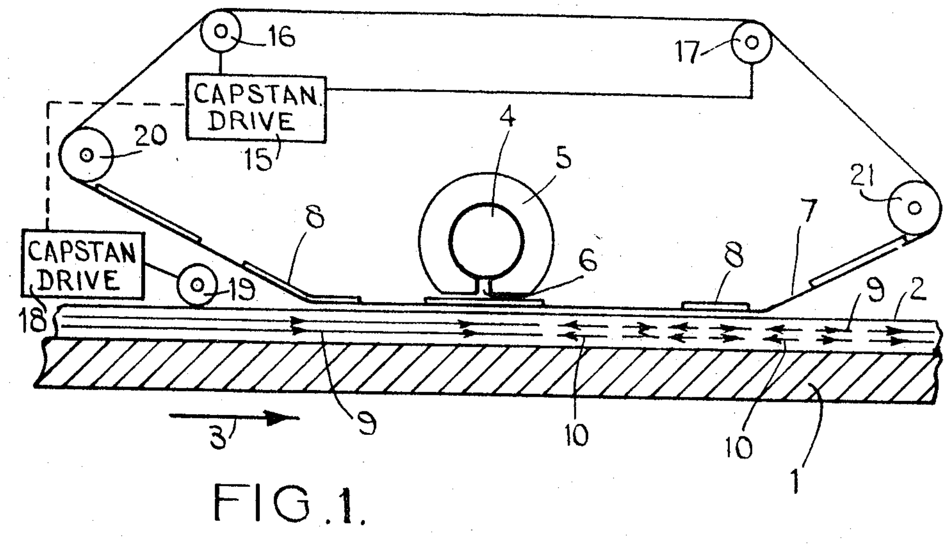
FIG. 1 shows a schematic sectional drawing of an arrangement for recording on a magnetizable surface.

Referring to FIG. 1, magnetic member, such as a tape, consists of a substrate 1 carrying a magnetizable layer 2. The tape may be in the form of a closed loop which is driven in the direction of arrow 3 by conventional feeding means (not shown).

Positioned adjacent to the surface of the tape is a magnetizing member consisting of a conductor 4 which is surrounded by a gapped cylinder 5 of a high permeability magnetic material, such as mumetal, permalloy or ferrite. Gap 6 in the cylinder 5 lies along a line which is perpendicular to the direction of movement of the tape. If a suitable value of current is passed through the conductor 4, the resulting fringe magnetic field across the gap 6 is sufficient to magnetize the layer 2 substantially to saturation. Interposed between the magnetizing member and the tape is a non-magnetic backing member 7 which carries a pattern of areas of high permeability magnetic material 8. The backing member and the areas 8 together constitute a screening member. The screening member may be made, for example, by bonding a thin sheet of mumetal to a plastic film and selectively etching the mumetal in known manner to produce the required pattern of magnetic areas. The screening member is fed by conventional means (not shown), so that, in the region of the recording member, it is travelling parallel to, and at the same speed as, the magnetic tape.

The layer 2 is magnetized uniformly in one direction, as indicated by arrows 9, by a D.C. or permanent magnet, erasing head, which is positioned upstream of the magnetizing member. The uniform unidirectional magnetic field in the layer produces very little fringing field outside the layer. Hence, a ferromagnetic powder which is applied to the layer is not held there. However, if the magnetization of a portion of the layer is reversed, as indicated by arrows 10, there is a substantial fringing field and the ferromagnetic powder is retained on the layer in the vicinity of the reversal. A continuous line of powder will result if a series of these alternations of magnetic field are in sufficiently close proximity to produce a substantial value of fringe fields all along that line.

The presence of a piece of the magnetic material 8 in front of the gap 6 (as shown in FIG. 1) screens the layer 2 from the fringe flux across the gap, since all, or a major part, of the flux will pass through the material 8. The field at the surface of the layer 2 can be reduced to a value which is too small to change the magnetization of the layer if, for example, the material 8 is a layer of mumetal only 0.002 in. in thickness.

On the other hand, when there is no material 9 between the gap and the tape, the gap field of magnet 5 is sufficient to magnetically saturate the layer 2. The conductor 4 is energized with an alternating current, the frequency of which is so related to the speed of movement of the tape that the alternations of magnetic field produced in the layer will hold a continuous layer of powder. Thus, if the material 8 has been etched to form the inverse of the required pattern, that pattern will be recorded as areas of alternating field on the layer and can be made visible by application of magnetic powder.

A conventional magnetic printing arrangement for selective printing may be positioned adjacent to the tape downstream of the conductor 4. Thus, for example, the screening member may be arranged to record the outline of a form and the conventional recording system used to record the necessary characters within the outline of the form. Since the two recording systems are closely spaced along a single tape, the problems of registering the characters within the outline are greatly reduced compared with the use of preprinted stationery.

The screening member is not limited to the recording of outlines. For example, it may be patterned to record characters, such as fixed descriptive headings, associated with the form. The screening member may be used conveniently for recording any pattern which is required repeatedly. For example, the screening member could record a circuit diagram, the printed legends on the completed diagram being added by the conventional recording system.

Various arrangements may be provided for feeding and selecting the screening member. In one arrangement, several screening members carrying different patterns are formed into a closed loop which is supported on a set of drive rollers 16 and 17 and idler rollers 20 and 21 as shown in FIG. 1. A capstan drive 15 is selectively operative to control the operation of rollers 16 and 17 and, hence, the positioning of the closed loop. Another capstan drive 18 is selectively operative to control drive capstan 19 to move substrate 1 and magnetizable layer 2 in synchronism with the operation of drive capstans 16 and 17. While a capstan drive arrangement has been shown, it will be appreciated that any suitable means for providing relative movement between the magnetizable layer 2 and recording member 5 may be provided. However, the screening member must be maintained stationary with respect to the magnetizable layer 2. Selective control of the drive rollers allows any desired one of the screening members to be positioned for movement past the conductor 4.

Alternatively, the backing member 7 may be made of a material, such as card stock, which is sufficiently rigid to allow the screening members to be fed one at a time from a stack. Preferably, a re-circulating storage drum of the type used in card and document feed is provided. This allows a screening member which has been used to be fed to the drum for temporary storage and then fed from the drum through the recording position. Thus, a particular screening member may be fed through the recording position as many times as may be desired.

For clarity, the magnetizable member has been shown as a layer on a tape. However, it will be appreciated that the layer may equally well consist of the surface of a magnetic recording drum or disc. The screening member may use an electrically conductive material, such as copper, instead of a magnetic material for the material 8. The screening effect than arises from the induction of eddy currents in the material 8 by the alternating field of the conductor 4.

The recording field is produced in the embodiment described by a single conductor 4. It will be understood that other field generating structures may be used, such as used for conventional erasing and recording heads. Several field generating structures may be used instead of one to cover the desired recording width. This allows selective recording. For example, the screening member may carry three separate patterns arranged side by side, across the tape, a separate recording structure being provided for recording each pattern. By selective application of current to the recording structures, any combination of the three patterns may be recorded in a single pass of the screening member.

Alternatively, it may be desired to retain relatively thick lines of powder on a magnetizable material. As stated previously, by reversing areas on the magnetic material, fringing fields are produced. If the fringing fields are of a sufficient value, the powder will be retained on the magnetizable material, but where thick lines are to be produced it has been found that the fringing fields have a low strength in the center of a reversed portion of the magnetizable material.

Figure 2:
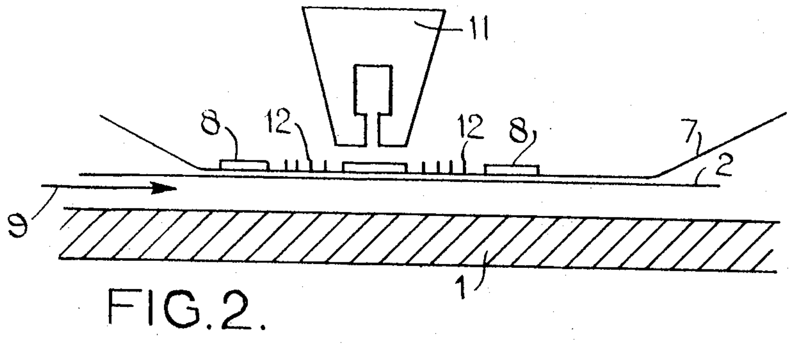
FIG. 2 shows a schematic sectional drawing of a second embodiment of the invention.

A second embodiment of the present invention is shown in FIG. 2 in which the above factors are considered. As is the case with FIG. 1, a tape consists of a substrate 1 having a magnetizable layer 2 thereon. A screening member is similarly comprised of a backing member 7 with magnetic material 8 thereon. In the present embodiment however, the backing member 7 also carries thin strips 12 of magnetic material. A permanent magnet 11 is provided to produce magnetic fields in layer 2 in a direction reverse to the direction shown by arrow 9. These reverse fields underlie the spaces between magnetic material 8 and strips 12. A drive arrangement similar to that shown in FIG. 1 may be provided for the apparatus of FIG. 2.

Figure 3:
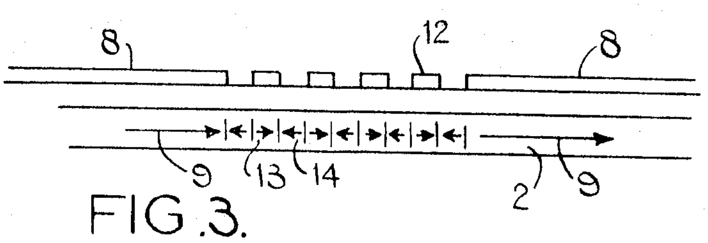
FIG. 3 shows an enlarged view of a portion of schematic sectional view of FIG. 2.

Referring now to FIG. 3, an enlarged portion of the tape, and screening member of FIG. 2 is shown. The direction of original magnetization is again shown by arrow 9 and also by arrow 13 since strips 12 of magnetic material will prevent magnet 11 from reversing the direction of magnetization immediately below the strips. However, small reversed fields having a direction shown by arrow 14 will be produced by magnet 11. These fields will underlie the spaces between magnetic strips 12 and magnetic material 8 as shown. It will be appreciated that since fringing fields will be produced at each reversal of magnetization, magnetic powder will adhere well to layer 2 in the center of a thick line. Thus, by assuring a more uniform distribution of magnetic powder, a thick line of substantially constant darkness thereacross may be printed.

The thin magnetic strips 12 may be produced by the following method. A magnetic material is first deposited over backing member 7 between portions of magnetic material 8. A fine mesh metallic grid is then superimposed over the deposited magnetic material prior to etching. The deposited magnetic material is then etched such that the magnetic material in the spaces of the grid are removed while the material which underlies the grid remains. When a D.C. field is applied to layer 2, portions 14 of FIG. 3 are reversed while portions 13 remains magnetized in the same direction as arrow 9. Magnetic material 8 must be resistant to the etchant, or if not, it must be suitably protected during the etching step.

It will be realized therefore, that as a result of the present invention, predetermined information such as business forms, can be printed without storing the forms in the storage section of a data processing apparatus. Different predetermined patterns may be conveniently stored in the form of tapes and by simply choosing a particular tape with the desired arrangement of magnetic materials 8 and 12, thereon, any predetermined pattern may be recorded on magnetizable layer 2 for subsequent printing.

I claim:

1. An apparatus for recording a predetermined magnetic pattern on a magnetizable member; including a recording member positioned adjacent the magnetizable member for producing a magnetic field; means for producing relative movement between the recording member and the magnetizable member; and a screening member interposable between the recording and magnetizably members thereby selectively to prevent the magnetic field from changing the magnetic state of the magnetizable member so that the predetermined pattern is recorded on the magnetic member, said screening member comprising a backing member and a plurality of first and second groups of magnetic elements provided on the backing member such that the elements of each second group are located between successive elements of a first group.

2. An apparatus as claimed in claim 1 in which said recording member includes a conductor which passes through a core of magnetic material with the variations of current in said conductor causing corresponding variations in said magnetic field.

3. An apparatus as claimed in claim 1 in which said recording member is a permanent magnet.

4. An apparatus as claimed in claim 1 in which said screening member is comprised of a backing layer with a plurality of electrically conductive, non-magnetic elements selectively positioned on said backing layer and whereby said electrically conductive elements effectively prevent said magnetic field from changing the magnetic state of those portions of the magnetizable member corresponding to said conductive elements.

* * * * *